United States Patent
Lee et al.

(10) Patent No.: US 10,619,602 B2
(45) Date of Patent: Apr. 14, 2020

(54) FUEL INJECTION CONTROL METHOD OF FUEL REFORMER AND FUEL REFORMING SYSTEM

(71) Applicants: HYUNDAI MOTOR COMPANY, Seoul (KR); KIA MOTORS CORPORATION, Seoul (KR)

(72) Inventors: Seung Woo Lee, Seoul (KR); Tae Won Lee, Incheon (KR); Hong Kil Baek, Seoul (KR); Thomas Hollowell, Superior Township, MI (US)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 16/213,688

(22) Filed: Dec. 7, 2018

(65) Prior Publication Data
US 2019/0345901 A1    Nov. 14, 2019

(30) Foreign Application Priority Data
May 10, 2018 (KR) .......... 10-2018-0053775

(51) Int. Cl.
| | |
|---|---|
| *F02M 26/36* | (2016.01) |
| *F02D 19/06* | (2006.01) |
| *F02D 41/14* | (2006.01) |
| *F02B 43/10* | (2006.01) |
| *F02M 26/35* | (2016.01) |

(Continued)

(52) U.S. Cl.
CPC ............ *F02M 26/36* (2016.02); *F02B 43/10* (2013.01); *F02D 19/0671* (2013.01); *F02D 41/1452* (2013.01); *F02M 26/04* (2016.02); *F02M 26/29* (2016.02); *F02M 26/35* (2016.02)

(58) Field of Classification Search
CPC ........ F02M 26/36; F02M 26/35; F02M 26/29; F02M 26/04; F02D 19/0671; F02D 41/1452; F02D 41/144; F02D 41/0072; F02B 43/10
USPC ............ 60/599, 600, 601, 603, 605.1, 605.2
See application file for complete search history.

(56) References Cited

U.S. PATENT DOCUMENTS

| | | | |
|---|---|---|---|
| 10,087,893 B2 * | 10/2018 | Yoon, II | F28F 1/426 |
| 2007/0227518 A1 * | 10/2007 | West | F01N 3/0842 |
| | | | 123/673 |

(Continued)

*Primary Examiner* — Hoang M Nguyen
(74) *Attorney, Agent, or Firm* — Morgan, Lewis & Bockius LLP

(57) ABSTRACT

A fuel injection control method includes measuring EGR (exhaust gas recirculation) rate through a CO2 sensor measuring the amount of CO2 entering the intake side of the engine, setting an optimum SCR (Steam to Carbon Ratio) value based on the measured EGR rate, calculating the amount of steam supplied to the engine based on the measured EGR rate, calculating an actual SCR value by the ratio of the steam amount and the carbon component of the fuel supplied to the engine, comparing the actual SCR value with the optimum SCR value, calculating the SCR difference value by subtracting the optimum SCR value from the actual SCR value if the actual SCR value is greater than the optimum SCR value, calculating an additional fuel amount to be added based on the SCR difference value, and injecting fuel to the fuel reformer based on the calculated additional fuel amount.

17 Claims, 3 Drawing Sheets

(51) Int. Cl.
*F02M 26/29* (2016.01)
*F02M 26/04* (2016.01)

(56) References Cited

U.S. PATENT DOCUMENTS

| | | | |
|---|---|---|---|
| 2014/0216029 A1* | 8/2014 | Gruber | F02B 37/00 60/605.1 |
| 2014/0288804 A1* | 9/2014 | Pursifull | F02D 41/1454 701/104 |
| 2015/0240738 A1* | 8/2015 | Yerace | F02B 3/08 123/27 GE |
| 2018/0135542 A1* | 5/2018 | Baek | F02D 41/0052 |

\* cited by examiner

FUEL INJECTION CONTROL METHOD OF FUEL REFORMER AND FUEL REFORMING SYSTEM

CROSS-REFERENCE TO RELATED APPLICATION

This application claims priority to and the benefit of Korean Patent Application No. 10-2018-0053775 filed in the Korean Intellectual Property Office on May 10, 2018, the entire contents of which are incorporated herein by reference.

BACKGROUND

(a) Field

The present disclosure relates to a fuel injection control method of fuel reformer and a fuel reforming system.

(b) Description of the Related Art

Hydrogen which is a material having most light and simple structure on earth has physical and chemical characteristic of about 6 times of laminar flame velocity and about three times of lower heating value compared with gasoline. Accordingly, during combusting by properly mixing gasoline and hydrogen, combustion speed and combustion stability may be increased to improve thermal efficiency by expanding lean boundary or increasing supply amount of exhaust gas recirculation.

The above information disclosed in this Background section is only for enhancement of understanding of the background and therefore it may contain information that does not form the prior art that is already known in this country to a person of ordinary skill in the art.

SUMMARY

One aspect of the invention provides a fuel injection control method of fuel reformer which optimizes injection amount of fuel for reforming based on driving condition and a fuel reforming system. Another aspect of the present invention provides a fuel injection control method of fuel reformer and a fuel reforming system which calculates the SCR value according to the EGR rate according to the driving conditions during the driving of the engine and injects additional fuel depending on the difference from the optimum SCR value.

A fuel injection control method according to an embodiment of the present invention includes measuring EGR (exhaust gas recirculation) rate through a CO2 sensor measuring the amount of CO2 entering the intake side of the engine, setting an optimum SCR (Steam to Carbon Ratio) value based on the measured EGR rate, calculating the amount of steam supplied to the engine based on the measured EGR rate, calculating an actual SCR value by the ratio of the steam amount and the carbon component of the fuel supplied to the engine, comparing the actual SCR value with the optimum SCR value, calculating the SCR difference value by subtracting the optimum SCR value from the actual SCR value if the actual SCR value is greater than the optimum SCR value, calculating an additional fuel amount to be added based on the SCR difference value, and injecting fuel to the fuel reformer based on the calculated additional fuel amount.

The EGR rate may be calculated by the ratio of the EGR gas flow rate to the sum of the EGR gas flow rate and the intake air flow rate introduced into the intake side of the engine, and the EGR gas flow rate is measured using the concentration of CO2 measured through the CO2 sensor.

The optimum SCR value may be a predetermined value by experiments as an SCR value having a maximum hydrogen conversion efficiency at the measured EGR rate.

The amount of steam flowing into the engine may be calculated by multiplying the engine fuel consumption by the measured EGR rate.

The additional fuel amount may be calculated by a PI (Proportional Integral) control and is calculated by the following equation (1).

$$F_{ad}(t) = K_p SCR_d(t) + K_i \int_0^t SCR_d(t)dt \quad \text{equation (1)}$$

Here, $F_{ad}(t)$ is the additional fuel amount, $SCR_d(t)$ is an SCR difference value, $K_p$, and $K_i$ are gain values, and t is a time.

The fuel injection control method according to an embodiment of the present invention may further include after the comparing the actual SCR value with the optimum SCR value, terminating without calculating an SCR difference value if the actual SCR value is not greater than the optimum SCR value.

Meanwhile, a fuel reforming system according to an embodiment of the present invention includes an engine combusting reformed gas to generate mechanical power, an intake line connected with the engine to supply reformed gas and air to the engine, an exhaust line connected with the engine to circulate exhaust gas exhausted from the engine, a CO2 sensor disposed upstream of the intake line for measuring the amount of CO2 contained in the reformed gas, a fuel reformer for converting the fuel mixed in the EGR gas into a reformed gas which is provided in an exhaust gas recirculation (EGR) line branching from the exhaust line, an additional fuel injector injecting additional fuel into the internal combustion engine is installed in, and mixes the EGR gas which is branched into the EGR line with the fuel, and a controller which calculates amount of steam supplied to the engine based on the EGR rate measured through the CO2 sensor, calculates an actual SCR value by the ratio of the steam amount and the carbon component of the fuel supplied to the engine, and calculates an additional fuel amount injected into the fuel reformer based on the difference between the actual SCR value and an optimum SCR value based on the measured EGR rate.

The fuel reforming system according to an embodiment of the present invention may further include a compressor connected with the intake line and compresses and supply the reformed gas and air to the engine, and a turbine connected to the exhaust line and rotated by the exhaust gas to generate power.

The fuel reforming system according to an embodiment of the present invention may further include a catalyst disposed in an exhaust line upstream of the fuel reformer for purifying nitrogen oxides contained in the exhaust gas.

The catalyst may include a lean NOx trap (LNT) which traps the nitrogen oxide included in the exhaust gas in a lean condition and desorbs the trapped nitrogen in a rich condition, and restores the nitrogen oxide included in the exhaust gas or the desorbed nitrogen oxide.

The catalyst may include a selective catalytic reducer (SCR) restoring the nitrogen oxide included in the exhaust gas by using reducing agent.

At the EGR line, an EGR valve adjusting flow rate of the reformed gas, and an EGR cooler provided at a rear end of the EGR valve for cooling the reformed gas may be installed.

The fuel reformer may be installed in front of the EGR cooler of the EGR line.

The fuel reforming system according to an embodiment of the present invention may further include a hydrogen sensor provided on the EGR line at a rear end of the fuel reformer for measuring a hydrogen production amount of the fuel reformer.

The fuel reforming system according to an embodiment of the present invention may further include a bypass EGR line branched from the exhaust line at the rear end of the catalyst and connected to the fuel reformer and bypassing exhaust gas and the EGR gas.

The fuel reforming system according to an embodiment of the present invention may further include a residual heat control valve being opened and closed such that the exhaust gas and the EGR gas passing through the catalyst bypasses the bypass EGR line or is directly introduced into the fuel reformer based on temperature thereof at the bypass EGR line.

The engine may further include a fuel amount sensor for measuring an engine fuel amount, and the fuel reformer may further include an EGR amount sensor for measuring an EGR gas amount.

According to an embodiment of the present invention, it is possible to improve the hydrogen conversion efficiency of the fuel reforming system to improve the reforming efficiency and improve the fuel efficiency of the vehicle by calculating in real time the amount of additional fuel injected into the fuel reformer through the optimum SCR value and the actual SCR value determined by the driving conditions of the vehicle.

<Description of symbols>

Figure 1:
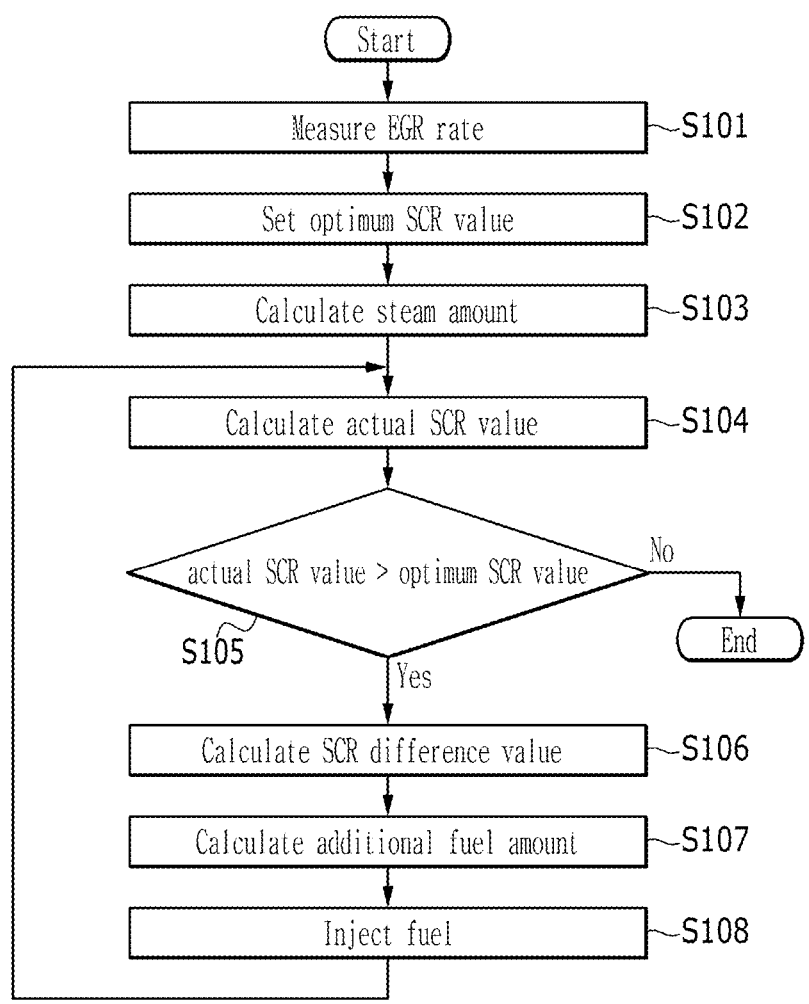
FIG. 1 is a flow chart illustrating a fuel injection control method of fuel reformer according to an embodiment of the present invention.

| | |
|---|---|
| 2: CO2 sensor | 3: fuel amount sensor |
| 5: intake line | 6: compressor |
| 7: turbine | 8: intercooler |
| 9: throttle valve | 10: engine |
| 15: exhaust line | 16: residual heat control valve |
| 17: EGR line | 18: bypass EGR line |
| 19: hydrogen sensor | 20: fuel reformer |
| 22: EGR amount sensor | 24: additional fuel injector |
| 25: EGR cooler | 26: EGR valve |
| 30: catalyst | 32: exhaust pressure control valve |

DETAILED DESCRIPTION OF THE EMBODIMENTS

Hereinafter, embodiments of the present invention will be described more fully with reference to the accompanying drawings, in which embodiments of the invention are shown. As those skilled in the art would realize, the described embodiments may be modified in various different ways, all without departing from the spirit or scope of the present invention.

Further, in embodiments, since like reference numerals designate like elements having the same configuration, a first embodiment is representatively described, and in other embodiments, only configurations different from the first embodiment will be described.

The drawings are schematic, and are not illustrated in accordance with a scale. Relative dimensions and ratios of portions in the drawings are illustrated to be exaggerated or reduced in size for clarity and convenience, and the dimensions are just exemplified and are not limiting. In addition, same structures, elements, or components illustrated in two or more drawings use same reference numerals for showing similar features. It will be understood that when an element such as a layer, film, region, or substrate is referred to as being "on" another element, it can be directly on the other element or intervening elements may also be present.

The drawings show embodiments of the present invention in detail. As a result, various modifications of the drawings will be expected. Therefore, the embodiment is not limited to a specific aspect of the illustrated region, and for example, includes modifications of an aspect by manufacturing.

Typically, a fuel reformer is a system generating hydrogen. The hydrogen is generated by reacting separate gasoline fuel supplied to the reformer with a catalyst in the reformer using thermal energy of high temperature exhaust gas exhausted from an engine.

In order to improve the fuel reforming efficiency, the steam to carbon ratio (SCR) value of the engine is calculated or measured, and additional fuel is injected into the fuel reformer to improve the fuel efficiency of the fuel reforming system. However, when there is no separate control logic for injecting the additional fuel in a typical reformer, the amount of fuel injection may be adjusted by calculating additional fuel separately based on the driving condition.

Now, a fuel injection control method of fuel reformer and a fuel reforming system according to an embodiment of the present invention will be described with reference to FIGS. 1 to 3.

Figure 2:
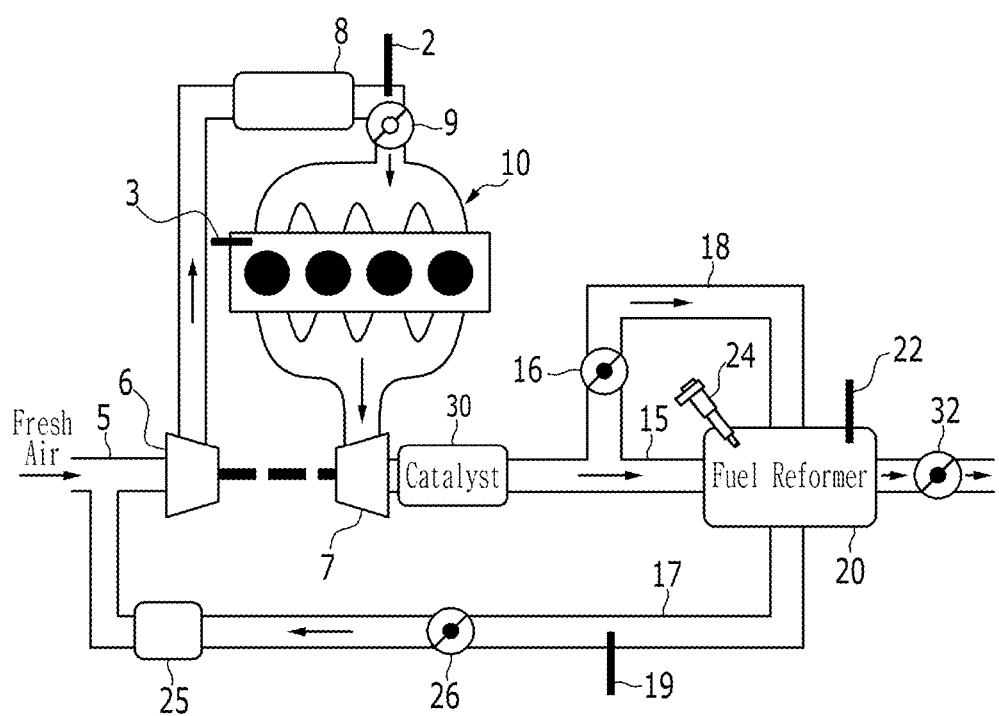
FIG. 2 is a schematic view illustrating a fuel reforming system according to an embodiment of the present invention.
Figure 3:
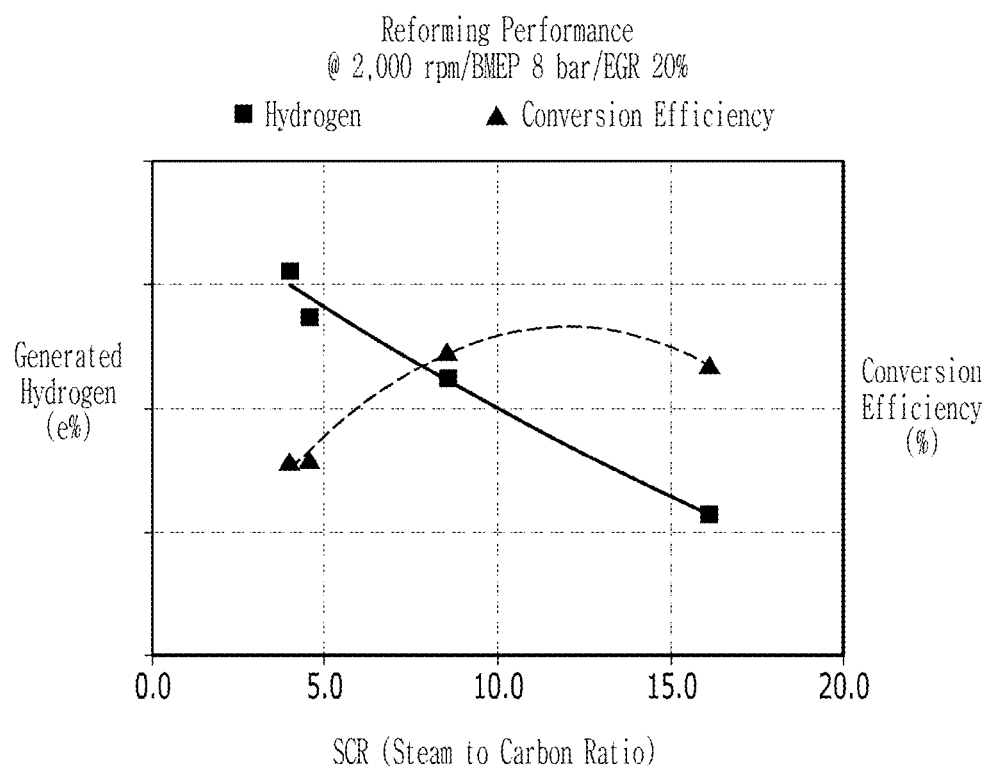
FIG. 3 is a graph illustrating an example for setting an optimum SCR value based on an EGR rate in the fuel reforming system according to an embodiment of the present invention.

FIG. 1 is a flow chart illustrating a fuel injection control method of fuel reformer according to an embodiment of the present invention, FIG. 2 is a schematic view illustrating a fuel reforming system according to an embodiment of the present invention, and FIG. 3 is a graph illustrating an example for setting an optimum SCR value based on an EGR rate in the fuel reforming system according to an embodiment of the present invention.

Firstly, referring to FIG. 2, a reforming system includes an engine 10, an intake line 5, an exhaust line 15, a CO2 sensor 2, a fuel reformer 20, a catalyst 30, and a controller.

The engine 10 burns air/fuel mixture in which fuel and air are mixed so as to convert chemical energy into mechanical energy. The engine 10 is connected to an intake manifold so as to receive the air in a combustion chamber, and is connected to an exhaust manifold such that exhaust gas generated in combustion process is gathered in the exhaust manifold and is exhausted to the exterior. An injector is mounted in the combustion chamber so as to inject the fuel into the combustion chamber.

A diesel engine is exemplified herein, but a lean-burn gasoline engine may be used. In a case that the gasoline engine is used, the air/fuel mixture flows into the combustion chamber through the intake manifold, and a spark plug is mounted at an upper portion of the combustion chamber. In a case that the gasoline engine is used, the air/fuel mixture flows into the combustion chamber through the intake manifold, and a spark plug is mounted at an upper portion of the combustion chamber.

In addition, the engines having various compression ratios, in embodiments, a compression ratio lower than or equal to 16.5, may be used.

The engine 10 may further include a fuel amount sensor 3 for measuring the amount of engine fuel and the fuel reformer 20 may further be include an EGR amount sensor 22 for measuring the amount of EGR gas.

The intake line 5 is connected with entrance of the engine 10 to supply reformed gas and air to the engine 10, and the exhaust line 15 is connected with exit of the engine 10 to circulate exhaust gas exhausted from the engine 10.

A portion of the exhaust gas exhausted from the engine is supplied to the engine 10 through the EGR line 17. Also, the EGR line 17 is connected with the intake manifold so that combustion temperature is controlled by mixing a portion of the exhaust gas with air. This combust temperature control is conducted by adjusting exhaust gas amount supplied to the intake manifold. Accordingly, EGR valve 26 adjusting flow rate of the reformed gas may be installed at the EGR line 17.

An exhaust gas recirculation system realized by the EGR line 17 supplies a portion of the exhaust gas to the intake system and inflows to combustion chamber when exhaust amount of the nitrogen oxide needs to be reduced based on driving condition. Then, the exhaust gas that is inert gas which volume is not changed depresses density of the air/fuel mixture and flame transmitting speed is reduced during combustion of the fuel. Therefore, combustion velocity of the fuel is reduced and raise of the combustion temperature is reduced to depress generation of the nitrogen oxide.

The $CO_2$ sensor $CO_2$ sensor 2 is disposed upstream of the intake line 5 and measures the amount of $CO_2$ contained in the reformed gas.

The fuel reformer 20 is provided in an exhaust gas recirculation (EGR) line 17 branching from the exhaust line 15, an additional fuel injector 22 injecting additional fuel into the internal combustion engine 10 is installed in, mixes the EGR gas which is branched into the EGR line 17 with the fuel, and converts the fuel mixed in the EGR gas into a reformed gas.

The fuel reformer 20 may include an entrance into which the exhaust gas inflows, a mixing portion which the exhaust gas and fuel are mixed, a reforming portion reforming the fuel, and an exit from which the exhaust gas outflows.

An exhaust pressure control valve 32 adjusting flow rate of the exhaust gas may be provided at a rear end of the fuel reformer 20 in the exhaust line 15.

The controller may calculate amount of steam supplied to the engine 10 based on the EGR rate calculated based on $CO_2$ amount information measured through the $CO_2$ sensor 2, calculates an actual SCR value by the ratio of the steam amount and the carbon component of the fuel supplied to the engine 10, and calculate an additional fuel amount injected into the fuel reformer 20 based on the difference between the actual SCR value and an optimum SCR value based on the measured or calculated EGR rate.

Meanwhile, the fuel reforming system according to an embodiment of the present invention may further include a compressor 6 connected with the intake line 5 and compresses the reformed gas and air to supply to the engine 10, and a turbine 7 connected with the exhaust line 15 and rotates by the exhaust gas to generate power.

Also, the reforming system may include an intercooler 8 connected with the compressor 6 and cooling air and reformed gas flowed into the intake line 5 of the engine 10 again, and a throttle valve 9 adjusting flow rate of the air and reformed gas.

Also, the fuel reforming system according to an embodiment of the present invention may further include a catalyst 30 disposed in an exhaust line 15 upstream of the fuel reformer 20 for purifying nitrogen oxides contained in the exhaust gas.

The catalyst 30 may include a lean NOx trap (LNT) which traps the nitrogen oxide included in the exhaust gas in a lean condition and desorbs the trapped nitrogen in a rich condition, and restores the nitrogen oxide included in the exhaust gas or the desorbed nitrogen oxide. The LNT may oxidize carbon monoxide (CO) and hydrocarbon (HC) included in the exhaust gas. Here, it should be understood that the hydrocarbon is used to imply compound including carbon and hydrogen in exhaust gas and fuel.

Also, the catalyst 30 may include a selective catalytic reducer (SCR) restoring the nitrogen oxide included in the exhaust gas by using reducing agent. The reducing agent may be urea injected from an injection module.

Meanwhile, at the EGR line 17, an EGR cooler 25 cooling the reformed gas, and an EGR valve 26 disposed at a rear end of the EGR valve 26 for adjusting flow rate of the reformed gas may be installed.

At this time, the fuel reformer 20 may be installed in front of the EGR cooler 25 of the EGR line 17, and a hydrogen sensor 19 may be provided on the EGR line 17 at a rear end of the fuel reformer 20 for measuring a hydrogen production amount of the fuel reformer 20.

Also, the fuel reforming system according to an embodiment of the present invention may further include a bypass EGR line 18 branched from the exhaust line 15 at the rear end of the catalyst and connected to the fuel reformer 20 and bypassing exhaust gas and the EGR gas.

A residual heat control valve 16 being opened and closed such that the exhaust gas and the EGR gas passing through the catalyst bypasses the bypass EGR line 18 or is directly introduced into the fuel reformer 20 based on temperature thereof may be further provided at the bypass EGR line 18.

Referring to FIG. 1, in a fuel injection control method an embodiment of the present invention, firstly, an EGR rate is calculated based on information obtained by or measured through a $CO_2$ sensor measuring the amount of $CO_2$ entering the intake side of the engine S101. The EGR rate is calculated by the ratio of the EGR gas flow rate to the sum of the EGR gas flow rate and the intake air flow rate introduced into the intake side of the engine, and the EGR gas flow rate may be measured or calculated using the concentration of $CO_2$ measured through the $CO_2$ sensor.

Then an optimum SCR (Steam to Carbon Ratio) value is set based on the measured EGR rate S102. The optimum SCR value is a predetermined value by experiments as an SCR value having a maximum hydrogen conversion efficiency at the measured EGR rate.

For example, referring to a graph of FIG. 3, when the measured EGR rate is 20% under an engine condition in which the engine speed is 2000 rpm and the braking mean effective pressure (BMEP) is 8 bar, the optimum SCR value is set as an SCR value having the maximum hydrogen conversion efficiency which is the peak in the hydrogen conversion efficiency curve.

Then, the amount of steam supplied to the engine is calculated based on the measured EGR rate S103. The amount of steam flowing into the engine may be calculated by multiplying the engine fuel consumption by the measured EGR rate. The engine fuel amount may be measured by a fuel amount sensor installed at the engine.

Then, an actual SCR value is calculated by the ratio of the steam amount and the carbon component of the fuel supplied to the engine S104.

Then, the actual SCR value is compared with the optimum SCR value S105, and the SCR difference value is calculated by subtracting the optimum SCR value from the actual SCR value if the actual SCR value is greater than the optimum SCR value S106.

Then, an additional fuel amount to be added is calculated based on the SCR difference value S107. At this time, the additional fuel amount is calculated by a PI control and may be calculated by the following equation (1).

$$F_{ad}(t)=K_p SCR_d(t)+K_i \int_0^t SCR_d(t)dt \qquad \text{equation (1)}$$

Here, $F_{ad}(t)$ is the additional fuel amount, $SCR_d(t)$ is an SCR difference value, $K_p$, and $K_i$ are gain values, and t is a time.

Then, the fuel is injected to the fuel reformer based on the calculated additional fuel amount S108.

After the comparing the actual SCR value with the optimum SCR value S105, it is terminated without calculating an SCR difference value if the actual SCR value is not greater than the optimum SCR value.

Like this, according to an embodiment of the present invention, it is possible to improve the hydrogen conversion efficiency of the fuel reforming system to improve the reforming efficiency and improve the fuel efficiency of the vehicle by calculating in real time the amount of additional fuel injected into the fuel reformer through the optimum SCR value and the actual SCR value determined by the driving conditions of the vehicle.

Logical blocks, modules or units described in connection with embodiments disclosed herein can be implemented or performed by a computing device having at least one processor, at least one memory and at least one communication interface. The elements of a method, process, or algorithm described in connection with embodiments disclosed herein can be embodied directly in hardware, in a software module executed by at least one processor, or in a combination of the two. Computer-executable instructions for implementing a method, process, or algorithm described in connection with embodiments disclosed herein can be stored in a non-transitory computer readable storage medium.

While this invention has been described in connection with what is presently considered to be practical embodiments, it is to be understood that the invention is not limited to the disclosed embodiments. On the contrary, it is intended to cover various modifications and equivalent arrangements included within the spirit and scope of the appended claims.

What is claimed is:

1. A fuel injection control method, comprising:
    calculating EGR (exhaust gas recirculation) rate using information from a CO2 sensor that measures an amount of CO2 entering an intake side of an engine;
    setting an optimum SCR (Steam to Carbon Ratio) value based on the measured EGR rate;
    calculating an amount of steam supplied to the engine based on the measured EGR rate;
    calculating an actual SCR value using the ratio of the steam amount and a carbon component of fuel supplied to the engine;
    comparing the actual SCR value with the optimum SCR value;
    calculating an SCR difference value by subtracting the optimum SCR value from the actual SCR value if the actual SCR value is greater than the optimum SCR value;
    calculating an additional fuel amount to be added based on the SCR difference value; and
    injecting fuel to the fuel reformer based on the calculated additional fuel amount.

2. The fuel injection control method of claim 1, wherein the EGR rate is calculated based on a ratio of an EGR gas flow rate with respect to the sum of the EGR gas flow rate and an intake air flow rate introduced into the intake side of the engine, and the EGR gas flow rate is calculated using the concentration of CO2 measured through the CO2 sensor.

3. The fuel injection control method of claim 1, wherein the optimum SCR value is a certain SCR value that is determined by experiments and has a maximum hydrogen conversion efficiency at the calculated EGR rate.

4. The fuel injection control method of claim 1, wherein the amount of steam flowing into the engine is calculated by multiplying the engine fuel consumption by the calculated EGR rate.

5. The fuel injection control method of claim 1, wherein the additional fuel amount is calculated by the following equation (1).

$$F_{ad}(t)=K_p SCR_d(t)+K_i \int_0^t SCR_d(t)dt \qquad \text{equation (1)}$$

(Here, $F_{ad}(t)$ is the additional fuel amount, $SCR_d(t)$ is an SCR difference value, $K_p$, and $K_i$ are gain values, and t is a time.)

6. The fuel injection control method of claim 1, further comprising:
    after the comparing the actual SCR value with the optimum SCR value,
    terminating without calculating an SCR difference value if the actual SCR value is not greater than the optimum SCR value.

7. A fuel reforming system, comprising:
    an engine configured to combust reformed gas to generate mechanical power;
    an intake line connected with the engine to supply reformed gas and air to the engine;
    an exhaust line connected with the engine to circulate exhaust gas exhausted from the engine;
    a CO2 sensor disposed upstream of the intake line and configured to measure the amount of CO2 contained in the reformed gas;
    a fuel reformer configured to convert the fuel mixed in exhaust gas recirculation (EGR) gas into a reformed gas which is provided in an EGR line branching from the exhaust line, wherein an additional fuel injector configured to inject additional fuel into the internal combustion engine is installed in, and is configured to mix the EGR gas which is branched into the EGR line with the fuel; and
    a controller configured to calculate an amount of steam supplied to the engine based on the EGR rate calculated based on information from the CO2 sensor, calculate an actual SCR value by the ratio of the steam amount and the carbon component of the fuel supplied to the engine, and calculate an additional fuel amount injected into the fuel reformer based on the difference between the actual SCR value and an optimum SCR value based on the measured EGR rate.

8. The fuel reforming system of claim 7, further comprising:
a compressor connected with the intake line and compresses and supply the reformed gas and air to the engine; and
a turbine connected to the exhaust line and rotated by the exhaust gas to generate power.

9. The fuel reforming system of claim 7, further comprising:
a catalyst disposed in an exhaust line upstream of the fuel reformer and configured to purify nitrogen oxides contained in the exhaust gas.

10. The fuel reforming system of claim 9, wherein the catalyst includes a lean NOx trap (LNT) which traps the nitrogen oxide included in the exhaust gas in a lean condition and desorbs the trapped nitrogen in a rich condition, and restores the nitrogen oxide included in the exhaust gas or the desorbed nitrogen oxide.

11. The fuel reforming system of claim 9, wherein the catalyst includes a selective catalytic reducer (SCR) restoring the nitrogen oxide included in the exhaust gas by using reducing agent.

12. The fuel reforming system of claim 7, wherein the EGR line comprises:
an EGR valve configured to adjust flow rate of the reformed gas, and
an EGR cooler provided at a rear end of the EGR valve and configured to cool the reformed gas.

13. The fuel reforming system of claim 12, wherein the fuel reformer is installed in front of the EGR cooler of the EGR line.

14. The fuel reforming system of claim 7, further comprising:
a hydrogen sensor provided on the EGR line at a rear end of the fuel reformer and configured to measure a hydrogen production amount of the fuel reformer.

15. The fuel reforming system of claim 7, further comprising:
a bypass EGR line branched from the exhaust line at the rear end of the catalyst and connected to the fuel reformer and bypassing exhaust gas and the EGR gas.

16. The fuel reforming system of claim 15, further comprising:
a residual heat control valve being opened and closed such that the exhaust gas and the EGR gas passing through the catalyst bypasses the bypass EGR line or is directly introduced into the fuel reformer based on temperature thereof at the bypass EGR line.

17. The fuel reforming system of claim 7, wherein the engine further includes a fuel amount sensor configured to measure an engine fuel amount, and the fuel reformer further includes an EGR amount sensor configured to measure an EGR gas amount.

* * * * *